United States Patent
Sen et al.

(10) Patent No.: US 10,520,997 B2
(45) Date of Patent: Dec. 31, 2019

(54) SUPPLYING POWER TO A COMPUTER ACCESSORY FROM A CAPTURED WIFI SIGNAL

(71) Applicant: HEWLETT-PACKARD DEVELOPMENT COMPANY, L.P., Houston, TX (US)

(72) Inventors: Souvik Sen, Palo Alto, CA (US); Jeremy Gummeson, Palo Alto, CA (US); David Lee, Palo Alto, CA (US); Martin R Fink, Palo Alto, CA (US); Kyu Han Kim, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/519,714

(22) PCT Filed: Jan. 8, 2015

(86) PCT No.: PCT/US2015/010561
§ 371 (c)(1),
(2) Date: Apr. 17, 2017

(87) PCT Pub. No.: WO2016/111686
PCT Pub. Date: Jul. 14, 2016

(65) Prior Publication Data
US 2017/0300098 A1 Oct. 19, 2017

(51) Int. Cl.
*G06F 1/26* (2006.01)
*G06F 3/038* (2013.01)
*G06F 3/0354* (2013.01)
*H02J 50/20* (2016.01)
*H02J 50/10* (2016.01)
*H02J 50/80* (2016.01)

(52) U.S. Cl.
CPC ............ *G06F 1/266* (2013.01); *G06F 3/0383* (2013.01); *G06F 3/03543* (2013.01); *H02J 50/20* (2016.02); *G06F 2203/0384* (2013.01); *H02J 50/10* (2016.02); *H02J 50/80* (2016.02)

(58) Field of Classification Search
None
See application file for complete search history.

(56) References Cited

U.S. PATENT DOCUMENTS

| | | | |
|---|---|---|---|
| 7,084,605 B2 | 8/2006 | Mickle et al. | |
| 8,362,745 B2 | 1/2013 | Tingphong | |
| 2003/0103039 A1 | 6/2003 | Burr et al. | |
| 2007/0109121 A1 | 5/2007 | Cohen | |

(Continued)

FOREIGN PATENT DOCUMENTS

WO  WO-2007019104 A2  2/2007

OTHER PUBLICATIONS

Ryan Whitwam, "Wireless power system charges devices up to 20 feet away", Jan. 6, 2015 Published by ExtremeTech on the World Wide Web (Year: 2015).*

(Continued)

*Primary Examiner* — Brian M Butcher
(74) *Attorney, Agent, or Firm* — HP Patent Department (57) ABSTRACT

Examples herein disclose capturing a wifi signal from a computing device corresponding to a computing accessory and harvesting energy from the captured wifi signal. The examples power the computing accessory based on the harvested energy.

11 Claims, 7 Drawing Sheets

(56) References Cited

U.S. PATENT DOCUMENTS

| | | |
|---|---|---|
| 2009/0201134 A1 | 8/2009 | Rofougaran |
| 2011/0053556 A1 | 3/2011 | Masaryk et al. |
| 2011/0175461 A1 | 7/2011 | Tinaphong |
| 2011/0181237 A1 | 7/2011 | Hamedi-Hagh et al. |
| 2011/0309686 A1 | 12/2011 | Scherbenski et al. |
| 2012/0274154 A1 | 11/2012 | Deluca |
| 2013/0005249 A1 | 1/2013 | Nahidipour |
| 2013/0234536 A1 | 9/2013 | Chemishkian et al. |
| 2013/0342025 A1 | 12/2013 | Cook et al. |
| 2014/0111032 A1 | 4/2014 | Shearer et al. |
| 2015/0326059 A1* | 11/2015 | Abu Qahouq .......... H02J 7/007 320/108 |

OTHER PUBLICATIONS

Anne Eisenburg, "Bye-Bye Batteries: Radio Waves as a Low-Power Source", Jul. 17, 2010, Published by The New York Times on the World Wide Web (Year: 2010).*

Lin Edwards, "RCA's Airenergy charger converts WiFi energy to electricity", Jan. 13, 2010, Published by PhysOrg on the World Wide Web (Year: 2010).*

Karen Hede, "Wireless Device Converts "Lost" Energy into Electric Power", Nov. 7, 2013, Published by Duke University on the World Wide Web (Year: 2013).*

Liu et al., "Ambient Backscatter: Wireless Communication Out of Thin Air", Aug. 2013, SIGCOMM (Year: 2013).*

Lu, X et al, "Wireless Networks with RF Energy Harvesting: A Contemporary Survey", Sep. 5, 2014.

Shrestha, S. et al, "Comparative Study of Antana Designs for RF Energy Harvesting" Jan. 17, 2013.

* cited by examiner

SUPPLYING POWER TO A COMPUTER ACCESSORY FROM A CAPTURED WIFI SIGNAL

BACKGROUND

Computing accessories, such as a keyboard, mouse, headset, and other peripherals consume much power during operation. This power consumption means a user may often replace the batteries for these computing accessories.

BRIEF DESCRIPTION OF THE DRAWINGS

In the accompanying drawings, like numerals refer to like components or blocks. The following detailed description references the drawings, wherein.

DETAILED DESCRIPTION

Computing devices, such as mobile phones, etc. may harvest energy from ambient sources over radio-frequencies airwaves; however, these computing devices may not harvest enough power to operate the respective computing device. For example, these computing devices may harvest energy as additional power to extend a battery life, but these batteries may still need replacement over time. Additionally, many of these harvesting energy technologies harvest energy at 900 Megahertz (MHz), but harvesting energy at 900 MHz may use a bulkier antenna, thus limiting the capability of harvesting energy in smaller type devices. Further, many harvesting energy technologies harvest from ambient sources in an environment, which makes harvesting energy less efficient.

As discussed herein, energy harvesting is the capability of converting wifi transmissions at frequencies of between 2.4 GHz and 5.0 GHz into a voltage. Computing devices, such as those compliant with IEEE 802) standards, may emit wifi transmissions to exchange data or communicate using wireless signals at frequencies of 2.4 gigahertz (GHz) and 5.0 gigahertz (GHz).

To address the above-referenced issues, some examples disclosed herein provide a more efficient harvesting rate thus improving the harvesting of power for a computing accessory. The examples disclose the computing accessory to capture a wifi signal from a computing device within close proximity to the computing accessory. Upon capturing the wifi signal, the computing accessory harvests energy. As such, the wifi signals transmitted by the computing device may be in a frequency range between 2.4 GHz to 5.0 GHz. Harvesting from 2.4 GHz wifi signals, the computing accessory is more efficient at harvesting power for consumption than at 900 MHz. Additionally harvesting power from wifi signals at no less than 2.4 GHz provides a smaller type of antenna thus enabling the harvesting technology for use in space constrained devices, such as the computing accessories.

Further, capturing the wifi signal from the computing device within close proximity to the computing accessory, provides an additional efficient aspect to improve the energy harvesting rate from the captured wifi signals. For example, the amount of power harvested by the computing accessory may be dependent on a distance the computing accessory is to the computing device. Thus, the further away the computing accessory is to the computing device (e.g., greater than 1.0 meter), the less power the computing accessory is able to harvest. Thus, the further the distance the computing device and computing accessory are to one another, the less likely the computing accessory may be able to harvest enough energy for operations.

Providing a more efficient energy harvesting rate, the computing accessory may rely on the wifi signals from the computing device as a primary source of power. Relying on the wifi signals as the primary source of power, eliminates the replacement of batteries, thus improving the user experience. Additionally relying on the wifi signals as the primary source of power, the harvested energy may perpetually power the computing accessory without interruption.

As such, examples disclosed herein provide an efficient harvesting rate for a computing accessory to capture wifi signals from corresponding computing device. This harvesting rate allows the computing accessory to rely on the energy harvested as the primary source of power without reliance on batteries and other auxiliary power supplies.

Figure 1:
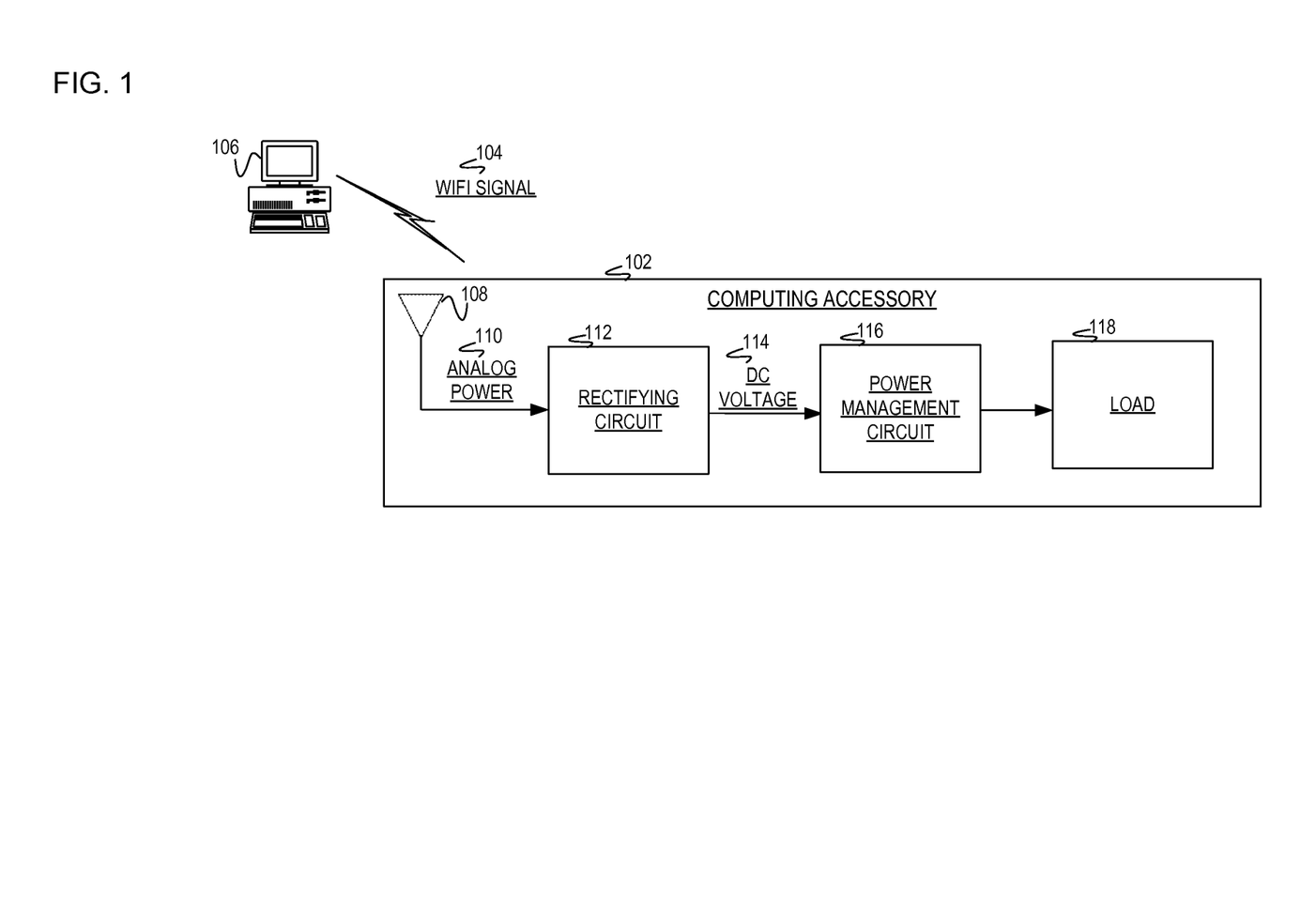
FIG. 1 is a block diagram of an example system including a computing accessory to receive a wifi signal from a computing device corresponding to the computing accessory for harvesting energy to power the computing accessory.

FIG. 1 is a block diagram of an example system including a computing accessory 102 to receive a wifi signal 104 from a computing device 106 corresponding to the computing accessory 102. The computing accessory 102 includes an antenna 108 to capture the wifi signal 104 from the computing device in close proximity (e.g., no greater than one meter apart from one another). The antenna 108 receives analog power 110 from the wifi signal 104 which is converted at a rectifying circuit 112 to produce a direct current (DC) voltage 114 for input to a power management circuit 116. The power management circuit 116 conditions and/or regulates the DC voltage 114 to provide a regulated voltage to a load 118 for consumption by the computing accessory 102. The computing device 106 corresponds to the computing accessory 102 in the sense that the computing accessory 102 is within close proximity (e.g., no greater than one meter) from the computing device 106. As such, the computing accessory 102 captures the wifi signal 104 directly from the computing device 106 rather than from other ambient sources in the system. In this implementation, the computing device 106 is the direct source of the wifi signal 104 for powering the computing accessory 102.

The computing device 106 is an electrical device including a transceiver (not illustrated) which transmits the wifi signal 104. The computing device 106 recognizes the computing accessory 102 for accepting input from that computing accessory 102. In this implementation, the computing device 106 is related to or corresponding to the computing accessory 102 as the computing device 106 is configured to receive input from that computing accessory 102 as opposed to other unrelated computing accessories. Implementations of the computing device 106 include by way of example, a computer, mobile device, client device, personal computer, desktop computer, laptop, tablet, video game console, or other type of electronic device capable of transmitting the wifi signal 104 to the computing accessory 102.

The wifi signal 104 is a local area wireless signal transmitted by the computing device 106 and received by the computing accessory 102. The wifi signal 104 allows the computing device 106 to exchange data with the computing accessory 102 and/or other computing devices. The wifi signal 104 operates at a wavelength range of no less than 2.4 GHz to 5.0 GHz.

The computing accessory 102 is an electrical device which provides additional functionality to the computing device 106. Implementations of the computing accessory 102 include by way of example, a computing mouse, keyboard, point of sale device, headset, peripheral, external hard drive, router, networking component, or other type of electronic device capable of receiving the wifi signal 104 for harvesting energy. Although FIG. 1 illustrates the computing accessory 102 including components 102, 112, 116, and 118, implementations should not be limited as this was done for illustration purposes. For example, the computing accessory 102 may also include additional circuitry not illustrated.

The antenna 108 is a transducer which is designed to transmit and/or receive electromagnetic waves, such as the wifi signal 104. The capability of the antenna 108 to capture the wifi signal 104 is based on the antenna 108 operating at no less than 2.4 gigahertz (GHz). In this implementation, the wifi signal 104 operates between 2.4 GHz to 5.0 GHz. In another implementation, a location of the antenna 108 is within a computing mouse under a scroll wheel. In a further implementation, the antenna 108 includes a monopolar antenna. These implementations are discussed in detail in a later figure.

The analog power 110 is a continuous signal which may periodically reverses direction. For example, for a first half-period the signal provides a negative power while for a second half-period signal provides a positive power. The analog power 110 observed at the output of the antenna 108 is limited by the power and distance of the transmitting antenna at the computing device 106. The analog power 110 diminishes the further away the computing accessory 102 is to the computing device 106.

The rectifying circuit 112 converts the analog power 110 as received from the captured wifi signal 104 to the DC voltage 114. The rectifying circuit 112 is an electrical circuit that converts alternating current (AC) of which periodically reverses direction, to direct current (DC) which flows to the power management circuit 116, thus producing the DC voltage 114 as a differential between the circuits 112 and 116. The rectifying circuit 112 may include electrical multiple electrical components, such as diodes and/or capacitors to convert the analog power 110 from the antenna 108 to the DC voltage. In one implementation, the rectifying circuit 112 includes at least two half-wave rectifiers to double the overall voltage delivered to the load 118. Implementations of the rectifying circuit 112 include, by way of example, a vacuum tube diode, mercury-arc valve, semiconductor diodes, half-wave rectifier, full-wave rectifier, silicon-controlled rectifier, and other silicon-based semiconductor switches.

The DC voltage 114 as output from the rectifying circuit 112 is used as input to the power management circuit 116. The DC voltage 114 is produced from the unidirectional flow of electrical charge and produced by the rectifying circuit 112.

The power management circuit 116 conditions the DC voltage 114 and current provided by the rectifying circuit 112 to efficiently power the computing accessory 102. As such, the power management circuit 116 may smooth and/or condition the DC voltage 114 to produce a regulated voltage for the computing accessory 102. Implementations of the power management circuit 116 include components such as a semiconductor chip, diodes, capacitor, and other circuitry to produce the regulated voltage for output to the load 118.

The load 118 receives the output from the power management circuit 116. The output includes conditioning the DC voltage 116 in such a manner that the output provides the range of power for operating the computing accessory 102. The load 118 represents those component(s) in the computing accessory 102 which may consume power to support the computing accessory 102. As such, examples of the load 118 include a processor, controller, storage device, or other components that may consume power for operating the computing accessory 102.

Figure 2A:
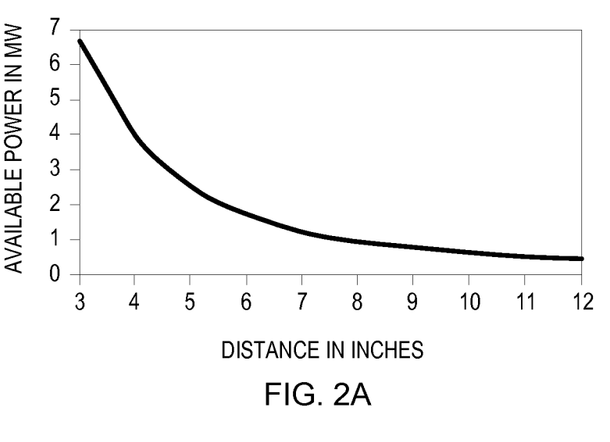
FIG. 2A is an example data graph representing an amount of energy available to a computing accessory upon transmission of a wifi signal from a computing device over a distance between the computing accessory and the computing device.

FIG. 2A is an example data graph representing an amount of energy available upon transmission of a wifi signal to a computing accessory over a distance. The distance, as illustrated on the y-axis, corresponds how far a computing accessory is away from a corresponding computing device. As such, FIG. 2A illustrates the amount of energy transmitted by the computing device based on wifi transmissions to the computing accessory used in conjunction with the computing device. The available amount of energy, as illustrated on the x-axis, reduces a greater a distance the computing accessory is to the computing device. For example, at a distance of 0.5 feet (i.e., 6 inches), the available power is 1.7 milliwatts. Thus, if the computing device is active for around 3 hours, a total energy available at the distance of 0.5 feet is 18.36 joules. This total amount of energy available at 0.5 feet provides enough power to keep the computing accessory powered for multiple hours.

Figure 2B:
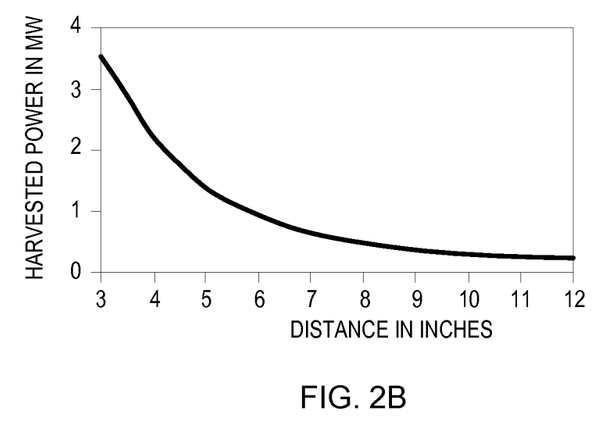
FIG. 2B is a data diagram of an example data graph representing an amount of energy harvested by a computing accessory over a distance of the computing accessory to a computing device.

FIG. 2B is an example data graph representing an amount of energy harvested by a computing accessory over a distance. The distance, as illustrated on the y-axis, corresponds to the distance between the computing accessory and the computing device. As such, FIG. 2B illustrates an output power from a rectifier circuit which converts an analog power received on the transmitted wifi signal to the power for use by the computing accessory. As such, the output power from the rectifier circuit varies at different distances near the wifi source (i.e., computing device). For example, at a distance of 0.5 feet, the computing accessory harvests power of 0.9 milliwatts.

Figure 3A:
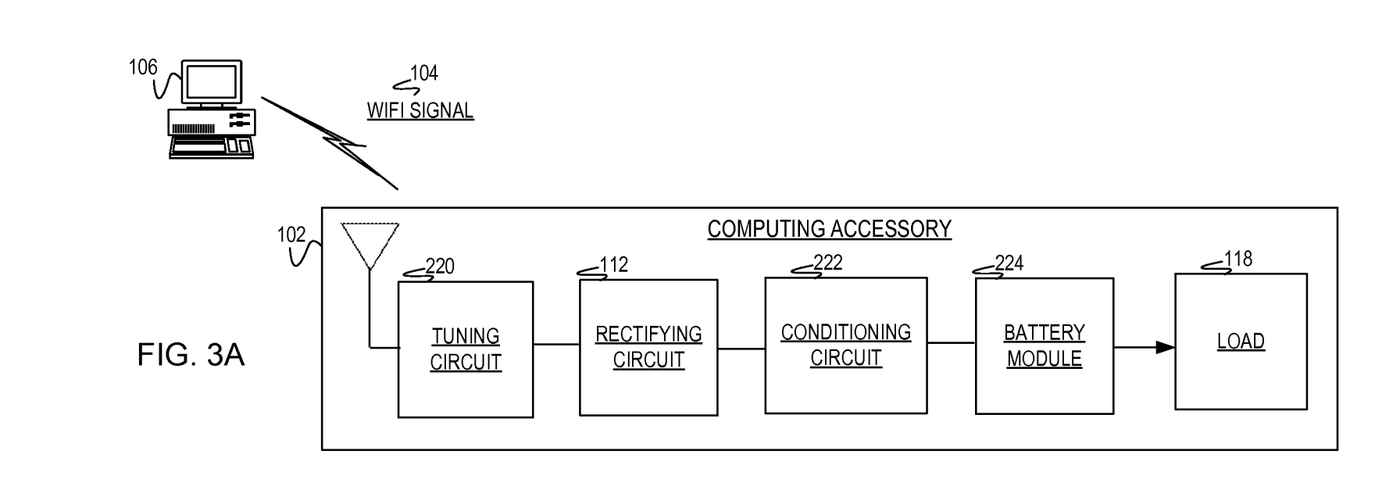
FIG. 3A is a block diagram of an example system including a computing accessory to tune a circuit for harvesting energy from a wifi signal transmitted by a computing device.

FIG. 3A is a block diagram of an example system to harvest energy from a wifi signal 104 and produce a voltage supplied to a load 118 for operation of a computing accessory 102. The system includes a computing device 106 to transmit the wifi signal 104 to the computing accessory 102. An antenna 108 captures the wifi signal 104 for the computing accessory to harvest corresponding energy. The computing accessory 102 tunes a circuit 220 to match an impedance to energy available transmitted by the wifi signal 104 to prevent losses from receiving an analog power. A rectifying circuit 112 receives the analog power from the tuning circuit 220 to produce a DC voltage supplied to a conditioning circuit 222. The conditioning circuit 222 receives the DC voltage and regulates the DC voltage for providing the regulated voltage to a battery module 224. The battery module 224 receives the regulated voltage and stores the regulated voltage for the load 118.

Figure 3B:
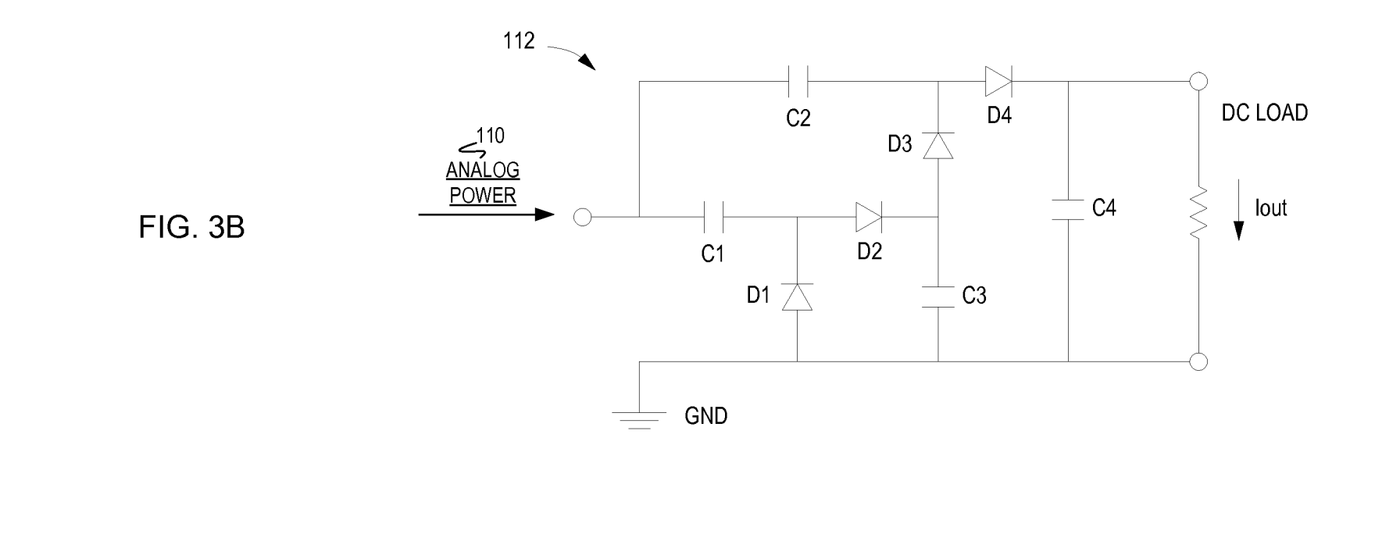
FIG. 3B is a circuit diagram of an example rectifying circuit to receive analog power from a wifi signal transmitted by a computing device and to convert the analog power into a direct current (DC) voltage for use by a computing accessory.

FIG. 3B is a circuit diagram of a rectifying circuit 112 to receive an analog power 110 from a wifi signal 104 transmitted by computing device 106. The rectifying circuit 112 produces a voltage from the analog power 110 to provide to load 118 for powering the computing accessory 102. FIG. 3B illustrates the circuit design of at least two stage Greinacher voltage doubler. In this implementation, the voltage generated is a larger amount of power than the analog power 110 from the captured wifi signal 104. The antenna 108 harvests energy from the wifi signal 104 with a frequency of at least at 2.4 GHz, observed through the analog power 110 (e.g., analog voltage). During a negative half of the analog power 110, diode D1 and capacitor C1 act as a half-wave rectifier, charging capacitor C1. During the positive half of the analog power 110, diode D1 is reversed biased and provides no discharge path for capacitor C1. Upon reaching the first cycle of the analog power 110, the DC voltage produced by the rectifying circuit 112 is doubled since the DC voltage combines the voltage from the negative half-period from the analog power 110. The combined voltage forward biases diode D2, resulting in voltage on capacitor C3. Diodes D3 and D4 and capacitors C2 and C4 serve as a second cascaded voltage doubling stage. Thus in this implementation, the output voltage provided to the load 118 is described in equation (1) as below:

$$V_{out} = 2n(V_{rf} - V_t)$$  Equation (1)

In equation (1), the analog power 110 is represented by $V_{rf}$, the number of cascaded stages is represented by n and the diode voltage is represented by $V_t$.

Figure 4A:
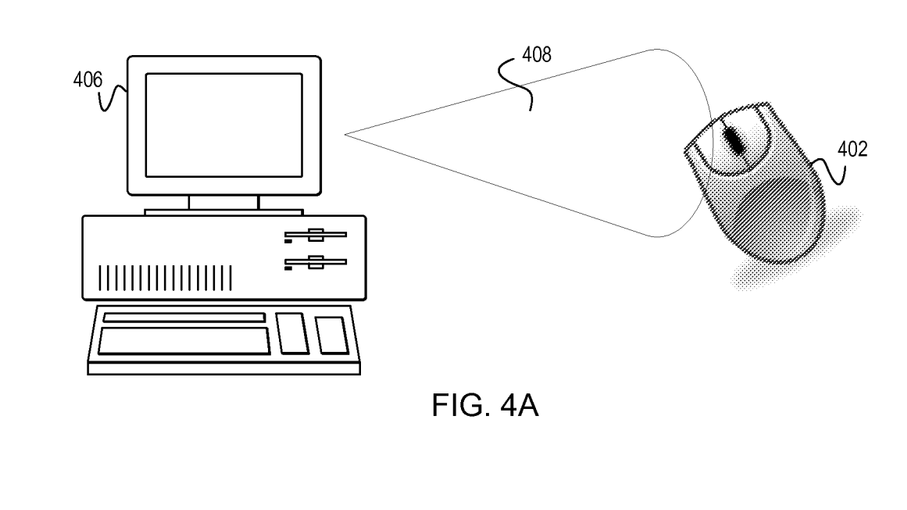
FIG. 4A is a diagram of an example system including a computing device to determine a location of a corresponding computer accessory and to form a radiation pattern directed towards the location of the corresponding computing accessory.

FIG. 4A is a diagram of an example system including a computing device 406 and a corresponding computing accessory 402 within close proximity of one another (e.g., less than one meter apart). The computing device 406 determines a location of the computing accessory 402 to form a radiation pattern 408 directed towards that location of the computing accessory 402. As such, FIG. 4A represents a location-based radiation pattern 408 (e.g., beam forming) for the computer accessory 402 to harvest energy from a wifi signal transmitted by the computing device 406. In this implementation, the computing device 406 determines the location of the computing accessory 402 either manually or due to collocation information from another device with a wireless transceiver. The location-based radiation pattern 408 involves an antenna in the computing device 406 to direct transmissions to the location of the computing accessory 402. This location-based radiation pattern 408 (e.g., beam forming) becomes attractive as the antenna within the computing device 406 uses fewer and smaller antenna elements unlike directional-based antennas. To form the location-based radiation pattern 408, the computing device 406 uses knowledge of various wireless propagation paths between the transmitter in the computing device 406 and the receiver in the computing accessory 402. These wireless propagation paths may also be referred to as wireless channel characteristics. In this implementation, the wireless channel between the transmitter and the receiver may be ascertained if channel feedback is obtained from the receiver (in the computing accessory 402). As such, the physical interaction is utilized for the wireless channel characteristics between the computing accessory 402 which includes the harvesting circuitry and the computing device 406 which includes a wireless transceiver.

Figure 4B:
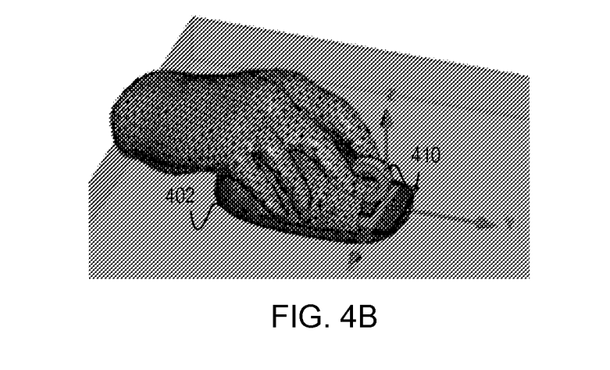
FIG. 4B is a diagram of an example computing mouse including placement of an antenna under a scroll wheel.

FIG. 4B is a diagram of an example computing accessory, such as a computing mouse 402. The computing mouse 402 includes placement of an antenna under a scroll wheel 410 of the mouse. As illustrated in FIG. 4B, antenna placement and design affects efficiency of an amount of power harvested by the computing mouse 402. For example, a user's hand consists of mainly of water which blocks much of a wifi signal at 2.4 GHz, thus causing poor harvesting power efficiency by the computing mouse 402. As such, placement of the antenna below the scroll wheel 410 takes into consideration how to capture an efficient amount of power from a transmitted wifi signal. Additionally, FIG. 4B represents a monopolar antenna as focusing the antenna's polarization towards the computing device 406, increases the antenna gain and consequently the available power received by the computing mouse 402.

In another implementation, the computing accessory includes a keyboard in which an antenna is placed towards the front of the keyboard which assumes the computing device 406 is located in front of the keyboard. In this implementation, the antenna's polarization is pointed towards the computing device 406, thus allowing the antenna to more efficiently harvest energy for consumption by the computing accessory (e.g., keyboard).

Figure 5:
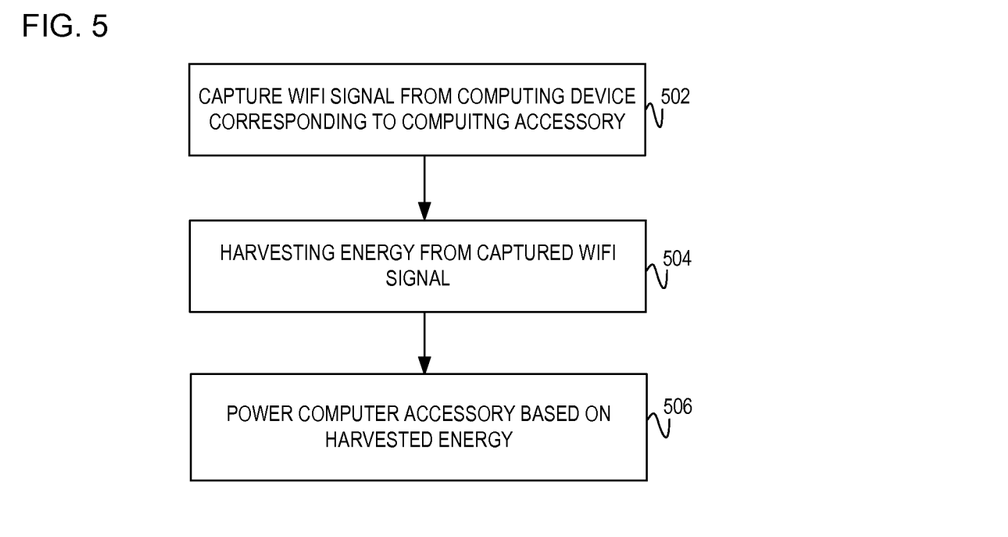
FIG. 5 is a flowchart of an example method to power a computer accessory based on harvested energy transmitted in a wifi signal by a corresponding computing device.

FIG. 5 is a flowchart of an example method, executable by a computing accessory, to power the computing accessory based on harvested energy. The computing accessory captures a wifi signal transmitted by a computing device corresponding to the computing accessory. The computing device corresponds to the computing accessory in such a manner that the computing accessory supplies input to the computing device. In this manner, the computing accessory is considered that accessory in communication with the computing device such that the computing accessory is that accessory being used with the computing device as opposed to other computing devices. Upon capturing the wifi signal from the computing device, the computing accessory harvests the energy from the wifi signal for conversion to a power for use as a primary source of power by the computing accessory. In discussing FIG. 5, references may be made to the components in FIGS. 1-4B to provide contextual examples. In one implementation, the computing accessory 102 as in FIGS. 1-3 executes operations 502-506 to power the computing accessory based on harvested energy from the wifi signal. Further, although FIG. 5 is described as implemented by a computing accessory, it may be executed on other suitable components. In one example, FIG. 5 may be implemented by a controller operating in conjunction with the computing accessory. In another example, FIG. 5 may be implemented in the form of executable instructions on a machine-readable storage medium 704 as in FIG. 7.

At operation 502, the computing accessory captures the wifi signal as transmitted by the computing device corresponding to the computing accessory. The wifi signal is considered a local area wireless technology that allows the computing device to exchange data or connect to the internet using a frequency within the range of 2.4 gigahertz (GHz) to 5.0 gigahertz (GHz) radio waves. To capture the wifi signal, the computing accessory is considered within close proximity to the computing device (e.g., no greater distance than one meter). Being within close proximity, the computing device may perpetually power the computing accessory. In one implementation, the computing accessory determines an amount of energy available from the wifi signal to tune a circuit internal to the computing accessory. In another implementation, the power transmitted to the computing accessory is in a range from 50 milliwatts to 200 milliwatts. In a further implementation, prior to capturing the wifi signal form the computing device, an antenna internal to the computing accessory forms a radiation pattern no less than 90 degrees to the computing device. Forming the radiation pattern no less than 90 degrees, enables the computing accessory to efficiently capture energy on the wifi signal from a particular direction towards the computing device.

At operation 504, the computing accessory harvests the energy from the captured wifi signal. In one implementation, the computing accessory may dynamically tune a circuit to harvest energy between 0.01 milliwatts and 2.0 milliwatts. In this implementation, an analog power transmitted with the wifi signal ranges between 50 milliwatts to 200 milliwatts, thus the energy captured from the wifi signal is between 0.01 milliwatts and 2.0 milliwatts. As such, the computing accessory may include a processor, controller or other type of component to control the tuning functionality. Upon harvesting the energy from the captured wifi signal, the computing accessory converts the harvested energy into a DC voltage and may condition the DC voltage to a regulated power for the computing accessory.

At operation 506, the computing accessory obtains the power from the harvested energy for operation. The power is considered the primary source of power for operating the computing accessory. As such, the computing accessory may not receive power from other sources and may depend primarily on harvested energy from the wifi signals transmitted by the nearby computing device. In one implementation, the power is supplied directly to the processor and/or controller of the computing accessory. In another implementation, the power is stored in a battery type device such as a capacitor, until the computing accessory retrieves this power for operations.

Figure 6:
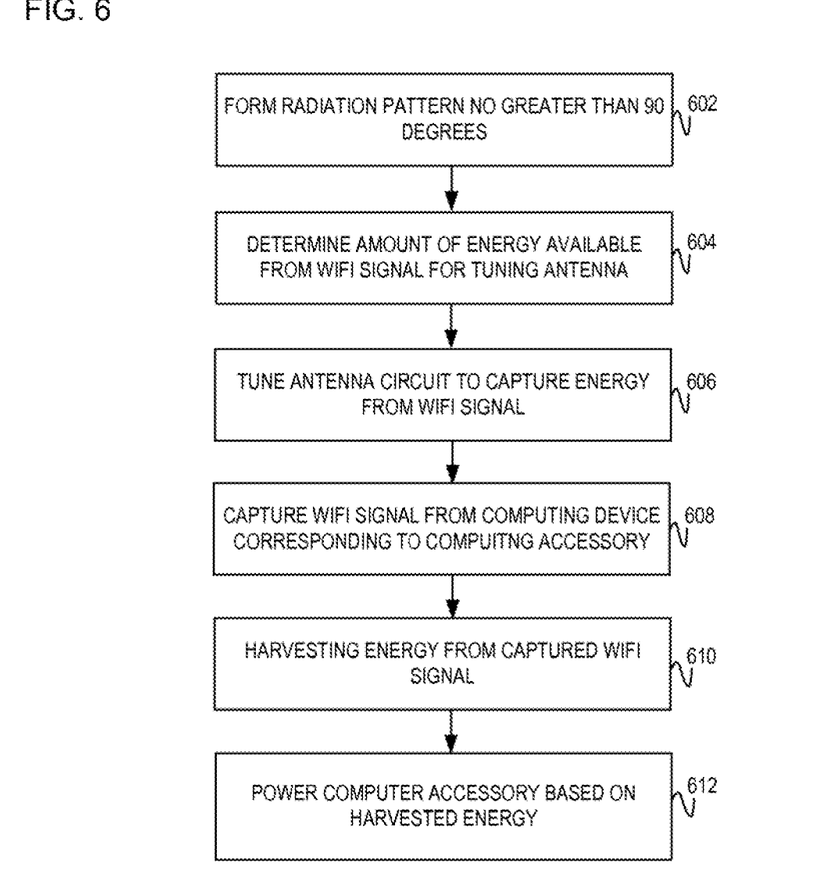
FIG. 6 is a flowchart of an example method, executable by a computing accessory, to tune a circuit for capturing a wifi signal from a computing device corresponding to the computing accessory and powering the computing accessory based on harvested energy from the wifi signal.

FIG. 6 is a flowchart of an example method, executable by a computing accessory, to tune a circuit for capturing a wifi signal from a computing device corresponding to the computing accessory. Upon capturing the wifi signal, the computing accessory harvests the energy for conversion to a regulated power for use as a primary source of power for operations of the computing accessory. In discussing FIG. 6, references may be made to the components in FIGS. 1-4B to provide contextual examples. In one implementation, the computing accessory 102 as in FIGS. 1-3 executes operations 602-612 to power the computing accessory based on energy harvested from the wifi signal transmitted by the corresponding computing device. Further, although FIG. 6 is described as implemented by a computing accessory, it may be executed on other suitable components. In one example, FIG. 6 may be implemented by a controller operating in conjunction with the computing accessory. In another example, FIG. 6 may be implemented in the form of executable instructions on a machine-readable storage medium 704 as in FIG. 7.

At operation 602, the computing accessory forms a radiation pattern no greater than 90 degrees and focused towards the computing device. The radiation pattern refers to the directional dependence of the strength of the wifi signals at the antenna. In this implementation, a processor and/or controller internal to the computing device may adjust the antenna to form the radiation pattern. In another implementation upon powering on the computing accessory, forms the radiation pattern. Forming the radiation pattern enables the antenna at the computing accessory to more efficiently capture energy from the wifi signals transmitted by the computing device.

At operation 604, the computing accessory determines an amount of energy available from the wifi signal to tune the circuit within the computing accessory. The computing accessory includes a sensor to measure the amount of energy transmitted on the wifi signal. As such, the computing accessory may use this measurement to tune the circuit to prevent loss of power from the captured wifi signal.

At operation 606, the computing device tunes the antenna circuit to harvest energy from the captured wifi signal. Operation 606 may include matching an impedance of the antenna to the amount of energy determined at operation 604.

At operation 608, the computing accessory captures the wifi signal transmitted by the computing device. The computing accessory includes the antenna operating as the receiver for receiving the wifi signal. Upon receiving the wifi signal, the antenna harvests an analog power from the wifi signal. As such, this analog power is used for converting to a DC voltage for powering the computing accessory. Operation 608 may be similar in functionality to operation 502 as in FIG. 5.

At operation 610, the computing accessory harvests energy from the captured wifi signal. Operation 610 may be similar in functionality to operation 504 as in FIG. 5.

At operation 612, the computing accessory utilizes the harvested energy from the captured wifi signal to power itself. The computing accessory may retrieve the power from a battery, such as a capacitor or other type of power storage to use as the primary source of power. As such, using the harvested energy as the primary source of power eliminates the use of disposable batteries for powering the computing accessory. The amount of power harvested for powering the computing accessory may be dependent on a distance the computing accessory is to the computing device. For example, the further away the computing accessory is to the computing device (no greater than 1 meter), the less amount of power the computing accessory is able to produce from the harvested energy. In another implementation, the computing accessory converts the harvested energy to 0.01 milliwatts to 1 milliwatt for powering the computing accessory. Operation 612 may be similar in functionality to operation 506 as in FIG. 5.

Figure 7:
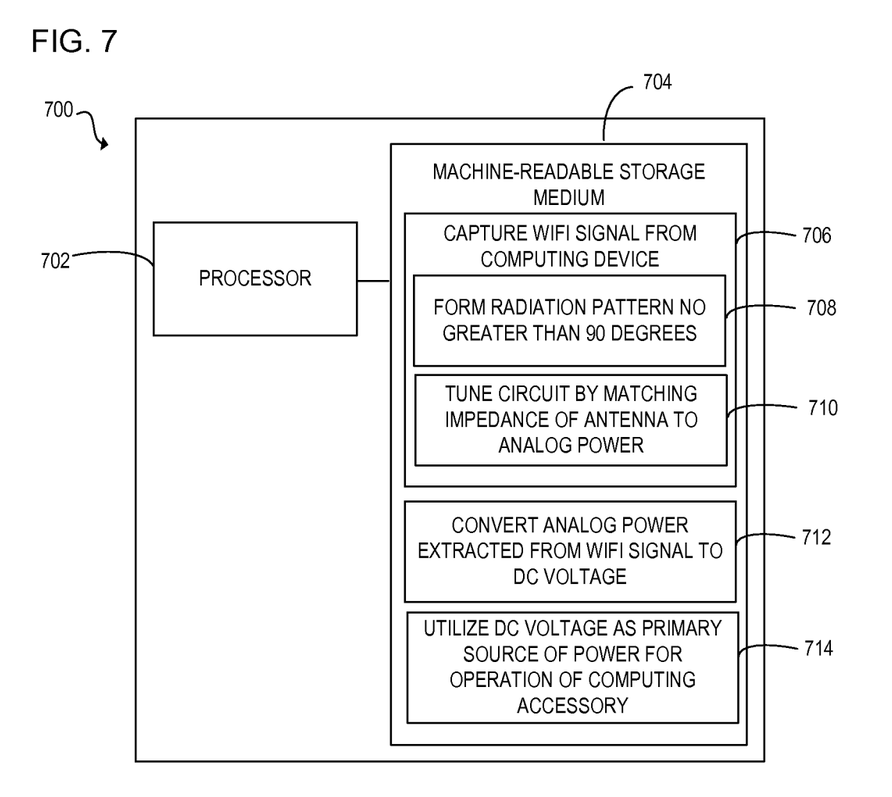
FIG. 7 is a block diagram of an example computing device with a processor to execute instructions in a machine-readable storage medium for utilizing direct current (DC) voltage as a primary source of power for power of a computing accessory.

FIG. 7 is a block diagram of computing accessory 700 with a processor 702 to execute instructions 706-714 within a machine-readable storage medium 704. Specifically, the computing accessory 700 with the processor 702 is to harvest power from a transmitted wifi signal and convert the power for use as a primary source of operation for the computing accessory 700. Although the computing accessory 700 includes processor 702 and machine-readable storage medium 704, it may also include other components that would be suitable to one skilled in the art. For example, the computing device 700 may include an additional processing component and/or storage. In another implementation, the computing accessory 700 includes the antenna 108 as in FIG. 1. The computing accessory 700 is an electronic device with the processor 702 capable of executing instructions 706-714, and as such embodiments of the computing accessory 700 include a mouse, keyboard, point of sale device, peripheral, headset, external hard drive, router, networking component, or other type of electronic device capable of executing instructions 706-714. The instructions 706-714 may be implemented as methods, functions, operations, and other processes implemented as machine-readable instructions stored on the storage medium 704, which may be non-transitory, such as hardware storage devices (e.g., random access memory (RAM), read only memory (ROM), erasable programmable ROM, electrically erasable ROM, hard drives, and flash memory).

The processor 702 may fetch, decode, and execute instructions 706-714 to harvest energy from the wifi signal transmitted by a computing device corresponding to the computing accessory 700. Upon harvesting the energy, the processor 702 may execute instructions to convert the harvested energy into a power for powering the computing accessory 700. In one implementation, the processor 702 may execute instruction 706 through the execution of instructions 708 and/or 710. In another implementation upon executing instructions 706-710, the processor 702 may execute instructions 712-714. Specifically, the processor 702 executes instructions 706-714 to: capture the wifi signal as transmitted by the corresponding computing device, the captured wifi signal includes energy which is harvested by the computing accessory 700; form a radiation pattern by the antenna, the radiation pattern no greater than 90 degrees; tune an antenna circuit by matching an impedance of the antenna to an analog power transmitted with the wifi signal; convert the analog power captured as part of the wifi signal to a DC voltage; and utilize the DC voltage as primary source of power for operation of the computing accessory 700.

The machine-readable storage medium 704 includes instructions 706-714 for the processor 702 to fetch, decode, and execute. In another embodiment, the machine-readable storage medium 704 may be an electronic, magnetic, optical, memory, storage, flash-drive, or other physical device that contains or stores executable instructions. Thus, the machine-readable storage medium 704 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 704 may include an application and/or firmware which can be utilized independently and/or in conjunction with the processor 702 to fetch, decode, and/or execute instructions of the machine-readable storage medium 704. The application and/or firmware may be stored on the machine-readable storage medium 704 and/or stored on another location of the computing accessory 700.

We claim:

1. A method, executable by a computing accessory, the method comprising:
    capturing a wifi signal from a computing device corresponding to the computing accessory;
    determining an amount of energy available, from the wifi signal, to tune a circuit within the computing accessory;
    harvesting the energy from the wifi signal; and
    powering the computing accessory based on the harvested energy.

2. The method of claim 1 wherein capturing the wifi signal from the computing device corresponding to the computing accessory includes:
    tuning an antenna circuit, internal to the computing accessory, to capture energy from the wifi signal between 0.01 milliwatts and two milliwatts.

3. The method of claim 1 wherein the computing device transmits the wifi signal and an associated power between 50 milliwatts and 200 milliwatts.

4. The method of claim 1 wherein capturing the wifi signal from the corresponding computing device includes:
    forming a radiation pattern no greater than 90 degrees from the computing accessory to the computing device.

5. A computing accessory comprising:
    an antenna module to capture a wifi signal from a corresponding computing device;
    a rectifying circuit to convert an analog power associated with the wifi signal from the antenna module to a direct current (DC) voltage;
    a tuning circuit to match impedance of the antenna module to an expected received power of the wifi signal between 0.01 milliwatts and two milliwatts; and
    a power management circuit to: supply the DC voltage to the computing accessory for operation of the computing accessory, wherein the DC voltage is a primary source of power for the computing accessory,
    wherein the corresponding computing device is a computer configured to receive input from the computing accessory.

6. The computing accessory of claim 5 wherein the computing accessory is a mouse and the antenna module includes a mono-polar antenna located below a scroll wheel of the mouse.

7. The computing accessory of claim 5 wherein a distance between the computing accessory and the corresponding computing device is no greater than one meter for capturing the wifi signal.

8. The computing accessory of claim 5 comprising:
    a conditioning circuit to receive the DC voltage from the rectifying circuit and convert the DC voltage to a voltage for use by the computing accessory; and
    a battery module, internal to the computing accessory, to receive the voltage for use by the computing accessory, the voltage is the primary source of power for operation of the computing accessory.

9. The computing accessory of claim 5 wherein the rectifying circuit includes at least two half-wave rectifiers to double the analog power for producing the DC voltage.

10. A non-transitory machine-readable storage medium comprising instructions that when executed by a processor cause a computing accessory to:
    capture a wifi signal of at least 2.4 gigahertz (GHz) from a computing device corresponding to the computing accessory;
    determine an amount of energy available, from the wifi signal, to tune a circuit within the computing accessory;
    convert an analog power extracted from the w fi signal to a direct current (DC) voltage; and
    utilize the DC voltage as a primary source of power for operation of the computing accessory.

11. The non-transitory machine-readable storage medium including the instructions of claim 10 wherein to capture the wifi signal at least 2.4 GHz from the computing device associated with the computing accessory includes instructions that when executed by the processor cause the computing accessory to:
  form a radiation pattern no greater than 90 degrees to the computing device; and
  tune a circuit by matching an impedance of an antenna to the analog power transmitted with the wifi signal between 50 milliwatts and 200 milliwatts.

* * * * *

UNITED STATES PATENT AND TRADEMARK OFFICE
CERTIFICATE OF CORRECTION

PATENT NO. : 10,520,997 B2  
APPLICATION NO. : 15/519714  
DATED : December 31, 2019  
INVENTOR(S) : Souvik Sen et al.

Page 1 of 1

It is certified that error appears in the above-identified patent and that said Letters Patent is hereby corrected as shown below:

On the Title Page

In Column 2, item (74), Attorney, Agent or Firm, Line 1, delete "HP" and insert -- HPI --, therefor.

In the Drawings

In sheet 6 of 7, FIG. 6, reference numeral 608, Line 2, delete "COMPUITNG" and insert -- COMPUTING --, therefor.

In the Claims

In Column 10, Line 61, Claim 10, delete "w fi" and insert -- wifi --, therefor.

Signed and Sealed this
Third Day of March, 2020

Andrei Iancu
*Director of the United States Patent and Trademark Office*